(12) United States Patent
Yan et al.

(10) Patent No.: US 8,313,821 B2
(45) Date of Patent: Nov. 20, 2012

(54) BARRIER FLUOROPOLYMER FILM-BASED LINERS AND PACKAGING COMPRISING SAME

(75) Inventors: Hongwei Yan, Eden Prairie, MN (US); Kevin T. O'Dougherty, Arden Hills, MN (US)

(73) Assignee: Advanced Technology Materials, Inc., Danbury, CT (US)

( * ) Notice: Subject to any disclaimer, the term of this patent is extended or adjusted under 35 U.S.C. 154(b) by 781 days.

(21) Appl. No.: 12/302,287

(22) PCT Filed: Jun. 1, 2007

(86) PCT No.: PCT/US2007/070260
§ 371 (c)(1),
(2), (4) Date: Jun. 24, 2009

(87) PCT Pub. No.: WO2007/143579
PCT Pub. Date: Dec. 13, 2007

(65) Prior Publication Data
US 2009/0297769 A1      Dec. 3, 2009

Related U.S. Application Data

(60) Provisional application No. 60/810,393, filed on Jun. 2, 2006.

(51) Int. Cl.
*B32B 1/04*       (2006.01)
*B32B 37/04*      (2006.01)
*B29D 23/00*      (2006.01)

(52) U.S. Cl. ............... 428/137; 428/188; 428/36.91; 428/35.2; 383/107; 220/560.03; 156/90

(58) Field of Classification Search ............... 428/36.91, 428/137, 188, 35.2, 35.7; 220/495.01–495.11, 220/560.03; 383/107
See application file for complete search history.

(56) References Cited

U.S. PATENT DOCUMENTS

| | | |
|---|---|---|
| 5,827,164 A | 10/1998 | Tomic |
| 6,117,508 A | 9/2000 | Parsonage et al. |
| 6,592,918 B2 | 7/2003 | Kaeser |
| 6,790,526 B2 | 9/2004 | Vargo et al. |
| 6,818,695 B2 | 11/2004 | Dillon et al. |
| 2003/0075555 A1 | 4/2003 | Mekias |
| 2009/0020176 A1 | 1/2009 | Hasegawa et al. |
| 2009/0212071 A1* | 8/2009 | Tom et al. ............ 222/95 |

FOREIGN PATENT DOCUMENTS

GB    2 172 261 A    9/1986

(Continued)

*Primary Examiner* — Rena Dye
*Assistant Examiner* — Yan Lan
(74) *Attorney, Agent, or Firm* — Vincent K. Gustafson; Jenkins, Wilson, Taylor & Hunt, P.A.

(57) ABSTRACT

A container liner comprises at least one sheet bounded along portions thereof to form at least one peripheral seam, with the at least one sheet including a first fluoropolymer layer, a barrier film layer, and a third layer bonded along at least peripheral portions thereof. Any of such layers may be peripherally bonded to form a gap or pocket therebetween, or bonded along substantially entire major surfaces thereof. Surface modification may be employed to facilitate bonding of materials having otherwise dissimilar surface energies. The resulting liner is adapted for storing and dispensing high purity chemical reagents, e.g., by placing the liner in an overpack, and applying pressurizing gas to a space between the liner and the overpack for progressive compaction of the liner to dispense its contents.

44 Claims, 7 Drawing Sheets

FOREIGN PATENT DOCUMENTS

| | | |
|---|---|---|
| JP | 2007-204102 A | 8/2007 |
| KR | 10-0385555 B1 | 5/2003 |
| KR | 10-0438101 B1 | 6/2004 |
| WO | 91/10604 A1 | 7/1991 |
| WO | WO2006/116389 * | 11/2006 |
| WO | 2007088661 A1 | 8/2007 |

* cited by examiner

US 8,313,821 B2

BARRIER FLUOROPOLYMER FILM-BASED LINERS AND PACKAGING COMPRISING SAME

STATEMENT OF RELATED APPLICATIONS

This is a U.S. national phase application under the provisions of 35 U.S.C. §371 of International Application No. PCT/US07/70260 filed on Jun. 1, 2007, which in turn claims priority of U.S. Provisional Patent Application No. 60/810,393 filed on Jun. 2, 2006. The disclosures of such international application and U.S. priority application are hereby incorporated herein by reference in their respective entireties, for all purposes.

FIELD OF THE INVENTION

The present invention relates to barrier fluoropolymer film-based liners, and packaging comprising such liners, for containment of materials such as high purity chemical reagents.

DESCRIPTION OF THE RELATED ART

In many industrial applications, chemical reagents and compositions are required to be supplied in a high purity state, and specialized packaging has been developed to ensure that the supplied material is maintained in a pure and suitable form, throughout the operations of package fill, storage, transport, and dispensation.

In the field of microelectronic device manufacturing, the need for suitable packaging is particularly compelling for a wide variety of liquids and liquid-containing compositions, since any contaminants in the packaged material, and/or any ingress of environmental contaminants to the contained material in the package, can adversely affect microelectronic device products that are manufactured with such liquids or liquid-containing compositions, rendering the microelectronic device products deficient or even useless for their intended use.

As a result of these considerations, many types of high-purity packaging have been developed for liquids and liquid-containing compositions used in microelectronic device manufacturing, such as photoresists, etchants, chemical vapor deposition reagents, solvents, wafer and tool cleaning formulations, chemical mechanical polishing compositions, etc.

One type of high-purity packaging that has come into such usage includes a rigid outer pack containing a liquid or liquid-based composition (or other material), in a flexible liner or bag that is secured in position in the rigid outer pack by retaining structure such as a lid or cover. Such packaging is commonly and variously referred to as "bag-in-box," "bag-in-container," or "bag-in-drum" (BID) packaging, depending on the specific form of the rigid outer pack. The rigid outer pack of the packaging may, for example, be formed of a high-density polyethylene or other polymer or metal, and the liner may be provided as a pre-cleaned, sterile collapsible bag of a polymeric film material, such as polytetrafluoroethylene (PTFE), low-density polyethylene, polyurethane, a polyethylene-based multilayer laminate, sheets composed of multiple PTFE layers, or the like, selected to be inert to the contained liquid or liquid-based material to be contained in the liner. Packaging of such type is commercially available under the trademark NOWPAK from ATMI, Inc. (Danbury, Conn., USA).

In dispensing operation involving such liner packaging of liquids and liquid-based compositions, the liquid is dispensed from the liner by connecting a dispensing assembly (optionally including a dip tube) to a port of the liner, with the optional dip tube immersed in the contained liquid. After the dispensing assembly has been thus coupled to the liner, fluid pressure is applied on the exterior surface of the liner, so that it progressively collapses and forces liquid through the dispensing assembly for discharge to associated flow circuitry to an end-use site. Alternatively, a negative pressure can be applied to the outlet of the liner or to a dispensing assembly connected thereto, in order to draw the liquid out of the package. The use of such liners offers many benefits, such as enabling re-use of rigid overpack containers without risk of cross-contamination or need for cleaning between uses, and reduction in disposal requirements compared to single-use of rigid containers.

Considering the liner itself, such liner desirably is characterized by low permeability, to limit the penetration of ambient gases through the liner into the liquid therein. High permeability liners result in increased contact area for gas penetration and contact with the liquid material contained in the liner. Accordingly, liner film materials, having superior barrier properties against gases in the ambient environment of the liner, are or may be critical to the utilization of liner-based packaging for containment of liquid materials that are adversely affected by such ambient gases.

Another characteristic of liners that is of primary importance in many applications is the particle-generating character of the liner, namely, the susceptibility of the liner to shed particles into the liquid material contained therein. Shedding may be caused under conditions of expansion and contraction of the liner, flexing, and translational movement of the liner, etc. For purposes of maintaining the quality and purity of the liquid material in the liner, it is desirable to minimize, and preferably eliminate, such particle shedding by the liner. As a result, efforts have been focused on the development of liner film materials that are resistant to particle shedding.

A number of liners are commercially available for liner-based packaging of a wide variety of materials. One liner product commercially available from ATMI, Inc. (Danbury, Conn.), under the trademark N400 (formerly FX), is fabricated of a multilayer laminate and is characterized by extremely low gas permeation rates as well as desirably high inertness, as a result of the use of specially formulated polyethylene-based film materials in the laminate.

Another such liner, which is commercially available from ATMI, Inc. (Danbury, Conn.) under the trademark ULTRA, utilizes polytetrafluoroethylene as a film material. Such liner is characterized by extremely low particle counts and thus superior particle shedding-resistance, as well has superior chemical inertness, in consequence of its polytetrafluoroethylene film material.

The aforementioned polytetrafluoroethylene film liners have found widespread commercial success. In applications in which the dispensing operation is conducted by applying pressure to the exterior surface of the liner to progressively compress and compact the liner and thereby effect discharge of the liquid material from the liner, the inherent permeability of polytetrafluoroethylene allows the pressurizing gas to penetrate the polytetrafluoroethylene film, thereby creating a significant probability of microbubble formation in the liquid material contained in the liner.

In such pressure-driven dispense systems, relatively high pressure (e.g., approximately 15 psig) is applied to force material out of the liner. For a liner packaging material without good gas barrier performance, the driving gas can readily migrate through material and saturate the liquid chemical. Once such liquid is released from the container, the saturated gas will form bubbles in the fluid, as a result of effervescence of the gas under reduced pressure conditions. This in turn can result in the occurrence of gross defects on wafers manufactured using the dispensed chemical reagent.

For example, in the pressure-dispensing of materials such as photoresists, top anti-reflective coatings (TARCs), and bottom anti-reflective coatings (BARCs), the formation of microbubbles having a size in a range of 0.1 to 60 µm is a source of potential defects when these materials are deposited on wafers. These materials are typically filled into containers in a gas-saturated condition (e.g., saturated with air). If the container then is pressurized, more gas will enter solution. In liner-based packages having headspace gas overlying the liquid material, the gas from the headspace will also dissolve into the liquid material if the annular space between the liner and the associated rigid container is pressurized. The dissolved gas then is very prone to come out of solution from the liquid material when the applied pressure is reduced, such as in dispensing pumps on their fill cycle or upon dispensation of the pure material to an atmospheric condition, such as at the surface of a wafer.

In general, film materials that have been utilized in fabrication liners vary widely in their permeability and other physical and chemical properties. The art has implemented a variety of multilayer films in the fabrication of liners, in attempts to optimize the overall characteristics of the liner. As mentioned above, polytetrafluoroethylene has been utilized for reasons of its chemical inertness, e.g., in the aforementioned ULTRA liner. Ethylene vinyl alcohol (EVOH) and polyamide (e.g., Nylon®) have also been utilized due to their very low permeation constants, e.g., in the aforementioned N400 (formerly FX) multilayer laminate including such materials, as well as polyethylene. The N400 laminate, while affording good performance properties in many liquid containment applications, may not be preferred in other applications, since (i) the inner layer of such laminate is polyethylene, which is not as chemically inert as other materials, e.g., polytetrafluoroethylene, (ii) polyethylene cannot be welded to polytetrafluoroethylene, (iii) air trapped between the liner layers represents a virtual leak, and (iv) the EVOH film in such laminate, although it provides a good barrier to nitrogen, does not provide a superior moisture barrier.

Thus, fluoropolymer materials such as polytetrafluoroethylene (PTFE) and perfluoroalkoxy (PFA) have been well accepted in the semiconductor manufacturing industry as packaging materials due to their superior chemical resistance, high temperature resistance, excellent flexibility, superior mechanical properties and high purity characteristics. With the development, however, of pressure-driven dispense systems in which pressure is externally applied to a film-type liner to progressively compact same for dispensing of the contained material, and the inherently permeability of fluoropolymer thin films, liners composed of fluoropolymer films are no longer qualified for use with semiconductor manufacturing due to their poor gas barrier performance.

In consequence, the art continues to seek improvements in fluoropolymer barrier film-based packaging, including liners for liner-based pressure-dispense packages, in which the many superior performance properties of fluoropolymer films are preserved, but with improvement in the inherently poor barrier properties of such films.

SUMMARY OF THE INVENTION

The present invention relates to barrier fluoropolymer film-based liners and packages comprising such liners, for containment of materials such as high purity chemical reagents.

In one aspect, the invention relates to a container liner comprising at least one sheet bonded along portions thereof to form at least one peripheral seam bounding an interior volume, with the at least one sheet comprising a fluoropolymer film layer, a barrier film layer, and a third film layer, with (i) the fluoropolymer film layer bonded along at least peripheral portions thereof to the barrier film layer and (ii) the third layer bonded along at least peripheral portions thereof to the barrier film layer, wherein said fluoropolymer film layer contacts said interior volume, and said barrier film layer is disposed between said fluoropolymer film layer and said third layer.

The "at least one sheet" in this context may include a single sheet folded upon itself and peripherally bonded (e.g., by welding) to form an enclosed shape, or may include a plurality of sheets peripherally bonded to one another.

The barrier film may include any of polyamide, polyetheretherketone (PEEK), polymonochlorotrifluoroethylene (PCTFE), polyester, polyethylene naphthalate (PEN), polyethylene terephthalate (PET), liquid crystal polymer (LCP), a metal, an oxide, a carbon material, an organic-inorganic composite, and a blend, composite, coating, or combination of any of the foregoing. The fluoropolymer film may include any of polytetrafluoroethylene (PTFE), perfluoroalkoxy (PFA), fluorinated ethylene propylene (FEP), ethylene chlorotrifluoroethylene (ECTFE), and a blend, composite, or combination of two or more of the foregoing. In certain embodiments, the third film layer is characterized by any of: (i) substantially the same composition as the fluorinated polymer layer; (ii) substantially the same coefficient of thermal expansion as the fluorinated polymer layer; (iii) a substantially higher melting temperature than the barrier layer; and (iv) a substantially non-stick surface character when heated to an absolute temperature of at least ninety percent of its melting point.

In another aspect, the invention relates to a material storage and dispensing package comprising the foregoing container liner disposed within an overpack container, wherein the container is substantially more rigid than said at least one sheet. Such liner may contain a reagent for microelectronic device manufacturing, such as a photoresist, in a zero or near-zero head space conformation. A material storage and dispensing package may be coupled in reagent supply relationship to a microelectronic device manufacturing tool. For such purpose, the liner may be coupled with a dispense assembly adapted for discharge of the chemical reagent from the liner by pressure dispense operation.

In another aspect, the invention relates to a method supplying material in a pure state for dispensing, utilizing the foregoing container liner.

The invention in a further aspect relates to a method of supplying material in a pure state for dispensing, e.g., by pressure dispense operation, in which the method includes packaging such material in a liner according to the invention. In the subsequent dispensing operation, the material is dispensed from the liner and may for example be flowed to a microelectronic device manufacturing tool.

A further aspect of the invention relates to a method of manufacturing a microelectronic device, comprising pressure dispensing of a microelectronic device manufacturing chemical reagent from a material storage and dispensing package of the invention.

In another aspect, the invention relates to a container liner comprising at least one sheet bonded along portions thereof to form at least one peripheral seam bounding an interior volume, with the at least one sheet comprising a fluoropolymer film layer, a barrier film layer, and a third film layer, with (i) the fluoropolymer film layer bonded along at least peripheral portions thereof to the barrier film layer and (ii) the third layer bonded along at least peripheral portions thereof to the barrier film layer, wherein at least one of the fluoropolymer film layer and the third film layer is peripherally bonded to the barrier film layer to define a gap or pocket therebetween within said at least one sheet, and said fluoropolymer film layer contacts said interior volume.

In another aspect, the invention relates to a method comprising bonding at least one sheet along portions thereof to form at least one peripheral seam bounding an interior volume, with the at least one sheet comprising (i) a fluoropolymer film layer bonded along at least peripheral portions thereof to a barrier film layer and (ii) a third layer bonded along at least peripheral portions thereof to the barrier film layer, wherein said fluoropolymer film layer contacts said interior volume, and said barrier film layer is disposed between said fluoropolymer film layer and said third layer.

In another aspect, any of the foregoing aspects may be combined for additional advantage.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
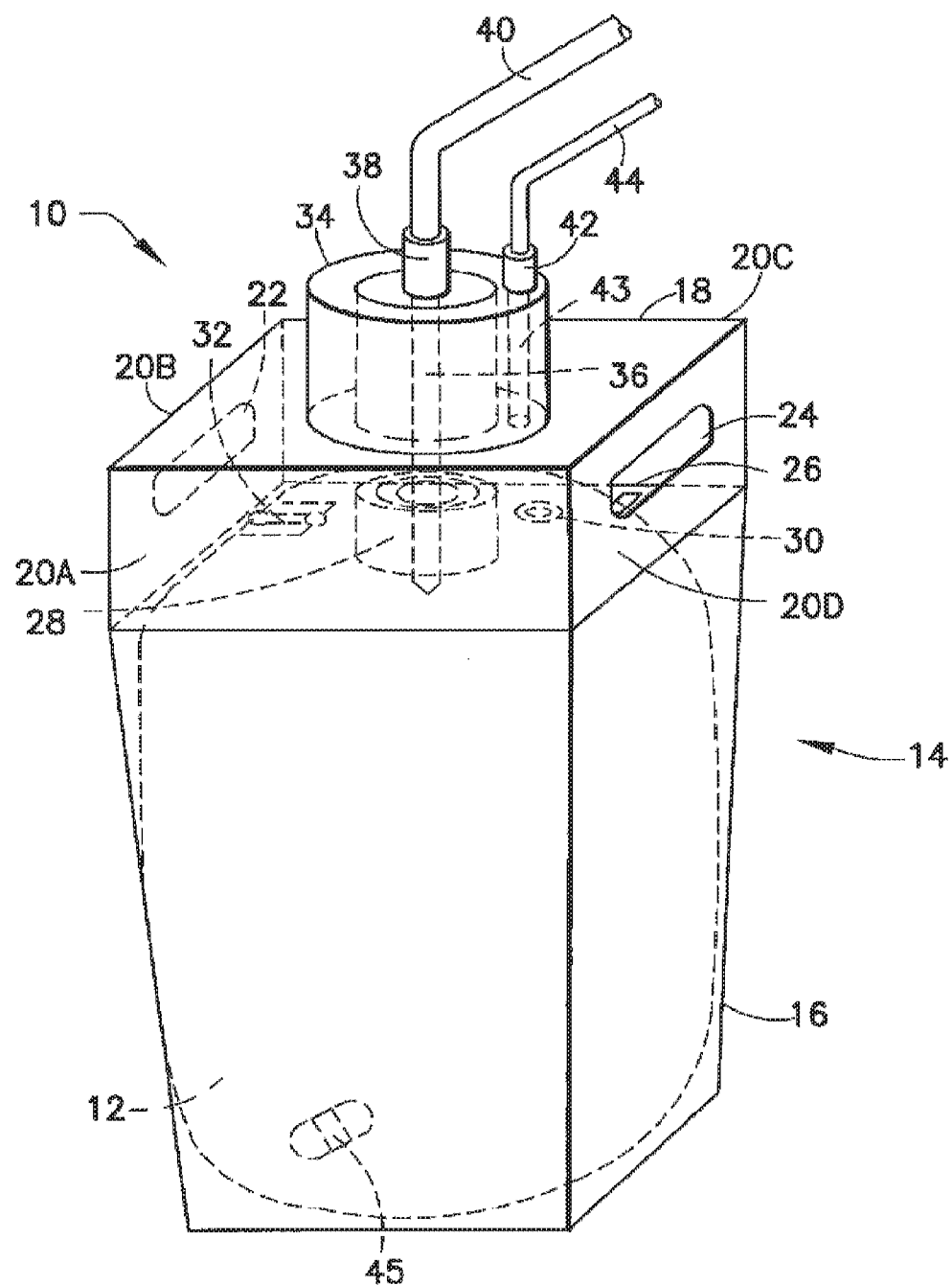
FIG. 1 is a perspective view of a first liner-based fluid storage and dispensing package, according to an embodiment of the present invention.

Liners according to the present invention utilize multilayer film-based sheets having the excellent chemical resistance of fluoropolymer films, and improved gas/moisture barrier performance. A multilayer sheet includes a fluoropolymer film and a barrier film, bonded along at least peripheral portions thereof to one another to provide an effective gas/moisture barrier, with the fluoropolymer film contacting an interior volume for storing a high purity material. A third film layer is further bonded along at least peripheral portions thereof to the barrier layer.

The third film layer provides enhanced leak protection in case the barrier and/or fluoropolymer film layers are compromised. As the third film layer and the fluoropolymer film layer sandwich the interior barrier layer, it is desirable for thermal bonding purposes for the third film layer to have a higher melting point than the barrier layer to permit thermal conduction through the third layer to the barrier layer without heating the third layer to a readily flowable condition that would compromise its integrity. Given the presence of dissimilar materials in the sheet comprising the fluoropolymer film layer, the barrier layer and the third layer, it is desirable to promote symmetry or near-symmetry with respect to thermal expansion characteristics between the inner (e.g., fluoropolymer film layer) and outer (e.g., third film layer) to avoid the potential for curling and distortion of a multilayer sheet when subjected to thermal changes. Such symmetry may be achieved by matching composition (and, optionally, further matching thickness) between a fluoropolymer film layer and third film layer of a single device, or and/or rather by matching materials with respect to coefficient of thermal expansion properties. Additionally, as a third layer material is subject to contact a working surface of a thermal bonding device (e.g., a filament heating device), such third layer material should advantageously have a substantially non-stick surface character when heated to an absolute temperature of preferably at least seventy-five percent of its melting point, more preferably at least ninety percent of its melting point, so as to avoid sticking between a liner and an apparatus used for bonding same. The third film layer may be further selected on the bases of any of mechanical strength, pin-hole resistance, high temperature resistance, and the like. In one embodiment, a third film layer of a multilayer sheet useful for forming a liner is thinner than a corresponding fluoropolymer (inner) film layer, such as to conserve cost.

A liner comprising such a multilayer sheet is advantageously employed for storage and dispensing of materials such as chemical reagents and compositions, e.g., high purity liquid reagents and compositions such as chemical mechanical polishing compositions used in the manufacture of microelectronic devices. Such a liner may be further adapted to contain materials other than fluids, including, without limitation, solids, slurries, suspensions, gels and semisolid compositions, as well as multiphase materials, including solids and associated vapor phases, liquids and associated vapor phases, solid/liquid/vapor materials, liquids, gases, and mixtures of the foregoing.

The disclosures of U.S. Patent Application Publication No. 2003/0205285 published Nov. 6, 2003 in the name of Wayne Kelly, et al. for "Apparatus and Method for Minimizing the Generation of Particles in Ultrapure Liquids," and U.S. Pat.

No. 6,698,619, issued Mar. 2, 2004 in the name of Richard Wertenberger for "Returnable and Reusable, Bag-In-Drum Fluid Storage and Dispensing Container System," are hereby incorporated herein by reference, in their respective entireties, for all purposes.

The term "microelectronic device" as used herein refers to resist-coated semiconductor substrates, flat-panel displays, thin-film recording heads, microelectromechanical systems (MEMS), and other advanced microelectronic components. The microelectronic device may include patterned and/or blanketed silicon wafers, flat-panel display substrates or fluoropolymer substrates. Further, the microelectronic device may include mesoporous or microporous inorganic solids.

In liner packaging of liquids and liquid-containing compositions (hereafter referred to as liquid media), it is desirable to minimize the head space of the liquid medium in the liner. The head space is the volume of gas overlying the liquid medium in the liner.

Liner-based containment systems of the present invention have particular utility in application to liquid media used in the manufacture of microelectronic device products. Additionally, such systems have utility in numerous other applications, including medical and pharmaceutical products, building and construction materials, food products, etc., where liquid media or liquid materials require packaging.

As used herein, the term "zero head space" in reference to fluid in a liner means that the liner is totally filled with liquid medium, and that there is no volume of gas overlying liquid medium in the liner.

Correspondingly, the term "near zero head space" as used herein in reference to fluid in a liner means that the liner is substantially completely filled with liquid medium except for a very small volume of gas overlying liquid medium in the liner, e.g., the volume of gas is less than 5% of the total volume of fluid in the liner, preferably being less than 3% of the total volume of fluid, more preferably less than 2% of the total volume of fluid, even more preferably being less than 1% of the total volume of fluid, and most preferably, being less than 0.01% of the total volume of fluid (or, expressed another way, the volume of liquid in the liner is greater than 95% of the total volume of the liner, preferably being more than 97% of such total volume, more preferably more than 98% of such total volume, even more preferably more than 99% of such total volume, and most preferably more than 99.99% of such total volume).

The greater the volume of the head space, the greater the likelihood that the overlying gas will become entrained and/or solubilized in the liquid medium, since the liquid medium will be subjected to sloshing, splashing and translation in the liner, as well as impact of the liner against the rigid surrounding container during transportation of the package. This circumstance will in turn result in the formation of bubbles, microbubbles, and particles in the liquid medium, which degrade the liquid medium, and render it potentially unsuitable for its intended purpose. For this reason, head space is desired to be minimized and preferably eliminated (i.e., in a zero or near-zero head space conformation) with complete filling of the interior volume of the liner with liquid medium.

Although described hereinafter with reference to various embodiments in which the dispense port is centrally located in the container structure, e.g., in the center of a drum head or container top wall, such central location is not required, and the dispense port can be alternatively located at any region of the material storage and dispensing container. Further, the container, while illustratively shown hereinafter as a closed-top drum in various embodiments of the invention, can alternatively be open, e.g., open head drums and closed head drums can be employed in respective implementations of the invention.

Referring now to the drawings, FIG. 1 is a perspective view of an illustrative material storage and dispensing container 10 including a multilayer film-based liner 12 according to one embodiment of the invention. The liner 12 is a flexible, resilient liner capable of holding material, e.g., a high purity liquid (having a purity of >99.99% by weight) in a generally rigid housing 14.

The liner 12 can be formed from tubular stock material, or by bonding (e.g., via heat-sealing) superimposed flat sheet stock pieces along peripheral edges thereof to form the liner structure. If tubular stock (e.g., a tubular polymeric film material) is employed, then heat seals and welded seams along the sides of the liner are avoided. The absence of side welded seams may be advantageous to permit the liner is better able to withstand forces and pressures that tend to stress the liner.

The liner preferably is fabricated as a single-use, multi-layer thin film liner 12, which is removed after each use (e.g., when the container is depleted of the liquid contained therein) and replaced with a new, pre-cleaned liner to enable the reuse of the overall container 10.

The liner preferably is free of components such as plasticizers, antioxidants, UV stabilizers, fillers, etc. that may be or become a source of contaminants, e.g., by leaching into the material contained in the liner, or by decomposing to yield degradation products that have greater diffusivity in the liner material and that migrate to the surface and solubilize or otherwise become contaminants of the material in the liner.

Substantially pure films are advantageously employed for the liner in a variety of material containment applications. Such films can, for example, be virgin (additive-free) film. Multiple films are assembled and at least peripherally bonded to form a multilayer sheet. The thickness of the resulting sheet can be any suitable thickness, e.g., in a range of from about 2 mils (50 microns) to about 20 mils (500 microns), more preferably in a range of from about 3 mils (75 microns) to 7 mils (175 microns), and still more preferably in a range of from about 4 mils (100 microns) to about 6 mils (150 microns)

The liner can be formed in any suitable manner. In one embodiment, a liner is manufactured from tubular film stock and includes an integral fill opening at an upper end thereof corresponding to a container opening, which may, as shown in FIG. 1, be joined to a port or cap structure 28. In another embodiment, a single sheet comprising multiple layers is folded upon itself and peripherally welded to bound an interior cavity. In a further embodiment, multiple sheets each comprising multiple layers are peripherally welded to one another to bound an interior cavity. Each of the foregoing liners preferably has an opening for coupling of the liner to a suitable connector for fill or dispense operations involving respective introduction or discharge of fluid. An aperture-defining fitment serving as a liner port is preferably provided (e.g., bonded) along such opening. Such fitment is preferably substantially more rigid than the sheet material with which the liner is formed, with such rigidity being useful to mate the liner to a mating structure such as a port or cap of an overpack container. A cap joined to the liner port can be manually removable and can be variously configured, as regards the specific structure of the liner port and cap. The cap also can be arranged to couple with a dip tube for introduction or dispensing of fluid.

The liner 12 preferably includes at least one port defined in a top portion thereof, such as the two ports shown in FIG. 1. The liner is disposed in a substantially rigid housing or overpack 14, which can be of a generally rectangular parallelepiped shape as illustrated, including a lower receptacle portion 16 for containing the liner 12 therein, and an upper stacking and transport handling section 18. The stacking and transport handling section 18 includes opposedly facing front and rear walls 20A and 20C, respectively, and opposedly facing side walls 20B and 20D. The opposedly facing side walls 20B and 20D have respective manual handling openings 22 and 24, respectively, to enable the container to be manually grasped, and physically lifted or otherwise transported in use of the container. Alternatively, the overpack can be of a generally cylindrical form, or of any other suitable shape or conformation. In a bag-in-drum package, the overpack is typically of cylindrical drum form.

The lower receptacle portion 16 of the housing 14 is as shown slightly tapered. All of the four walls of the lower receptacle portion 16 are downwardly inwardly tapered, to enable the stacking of the containers for storage and transport, when a multiplicity of such containers are stored and transported. In one embodiment, the lower portion 16 of housing 14 may have tapered walls whose taper angle is less than 15°, e.g., an angle between about 2° and 12°.

The generally rigid housing 14 also includes an overpack lid 26, which is leak-tightly joined to the walls of the housing 14, to bound an interior space in the housing 14 containing the liner 12, as shown.

As illustrated, the liner has two rigid ports, including a main top port coupling to the cap 28 and arranged to accommodate passage therethrough of the dip tube 36 for dispensing of liquid. The dip tube 36 is part of the dispensing assembly including the dip tube, dispensing head 34, coupling 38 and liquid dispensing tube 40. The dispensing assembly also includes a gas fill tube 44 joined to dispensing head 34 by coupling 42 and communicating with a passage 43 in the dispensing head. Passage 43 in turn is adapted to be leak-tightly coupled to the interior volume port 30 in the overpack lid 26, to accommodate introduction of a gas for exerting pressure against liner 12 in the dispensing operation, so that liquid contained in liner 12 is forced from the liner through the interior passage of the hollow dip tube 36 and through the dispensing assembly to the liquid dispensing tube 40.

The liner 12 is formed of at least one sheet of a multilayer film material of appropriate thickness to be flexible and collapsible in character. In one embodiment, the liner is compressible to about 10% or less of the rated fill volume, i.e., the volume of liquid able to be contained in the liner when same is fully filled in the housing 14. The liner materials are sufficiently pliable to allow for folding or compressing of the liner during shipment as a replacement unit. The liner has a composition and character that is resistant to particle and microbubble formation when liquid is contained in the liner, and that is effective to maintain purity for the specific end use application in which the contained material is to be employed, e.g., in semiconductor manufacturing or other high purity-critical liquid supply application.

For semiconductor manufacturing applications, when a liquid or liquid-containing material is contained in the liner 12 of the container 10, the liquid should have less than 75 particles/milliliter of particles having a diameter of 0.25 microns, at the point of fill of the liner, and the liner should have less than 30 parts per billion total organic components (TOC) in the liquid, with less than 10 parts per trillion metal extractable levels per critical elements, such as calcium, cobalt, copper, chromium, iron, molybdenum, manganese, sodium, nickel, and tungsten, and with less than 150 parts per trillion iron and copper extractable levels per element for liner containment of hydrogen fluoride, hydrogen peroxide and ammonium hydroxide, consistent with the specifications set out in the Semiconductor Industry Association, International Technology Roadmap for Semiconductors (SIA, ITRS) 1999 Edition.

The liner 12 of the FIG. 1 container may optionally contain in its interior space a magnetic pellet 45, as illustrated, to aid in non-invasive magnetic stirring of the liquid contents, as an optional feature. The magnetic stirring pellet 45 may be of a conventional type as used in laboratory operations, and can be utilized with an appropriate magnetic field-exerting table, so that the container is able, when reposed on the table with the liner filled with liquid, to be stirred, to render the liquid homogeneous and resistant to settling. Such magnetic stirring capability may be employed to resolubilize components of liquid subsequent to transit of liquid under conditions promoting precipitation or phase separation of the liquid contents. The stirring element being remotely actuatable in such manner has the advantage that no invasive introduction of a mixer to the interior of the sealed liner is necessary.

The liner 12 is suitably constructed so that when filled with liquid, there is a zero- or near-zero headspace in the interior volume of the liner. By eliminating a gas/liquid (e.g., air/liquid) interface within the liner, particle generation is correspondingly suppressed; additionally, such zero- or near-zero head space liner conformation enables full filling of the liner interior volume with liquid, thereby maximizing the capacity of the liner and associated container.

The port 30 in deck 26 of the housing 14 can be coupled with a rigid port on the liner, so that the liner is fabricated with two ports, or alternatively the liner can be fabricated so that it is ventable using a single port configuration.

Deck 26 of the housing 14 may be formed of a same generally rigid material as the remaining structural components of the housing, such as polyethylene, polytetrafluoroethylene, polypropylene, polyurethane, polyvinylidene chloride, polyvinylchloride, polyacetal, polystyrene, polyacrylonitrile, and polybutylene.

As a further optional modification of the container 10, a radio frequency identification tag 32 may be provided on the liner, for the purpose of providing information relating to the contained liquid and/or its intended usage. The radio frequency identification tag can be arranged to provide information via a radio frequency transponder and receiver to a user or technician who can thereby ascertain the condition of the liquid in the container, its identity, source, age, intended use location and process, etc. In lieu of a radio frequency identification device, other information storage may be employed which is readable, and/or transmittable, by remote sensor, such as a hand-held scanner, computer equipped with a receiver, etc.

In the FIG. 1 container the liner 12 allows the liquid to expand and contract due to temperature changes.

In a dispensing operation involving the container 10 shown in FIG. 1, air or other gas (nitrogen, argon, etc.) may be introduced into tube 44 and through port 30 of lid 26, to exert pressure on the exterior surface of the liner, causing it to contract and thereby forcing liquid through the dip tube 36 and dispensing assembly to the liquid dispensing tube 40.

Correspondingly, air may be displaced from the interior volume of housing 14 through port 30, for flow through the passage 43 in dispensing head 34 to tube 44 during the filling operation, so that air is displaced as the liner expands during liquid filling thereof.

As an alternative dispensing modality, suction may be applied to the liquid medium in the liner, to extract the liquid medium from the container in the dispensing operation.

Figure 2:
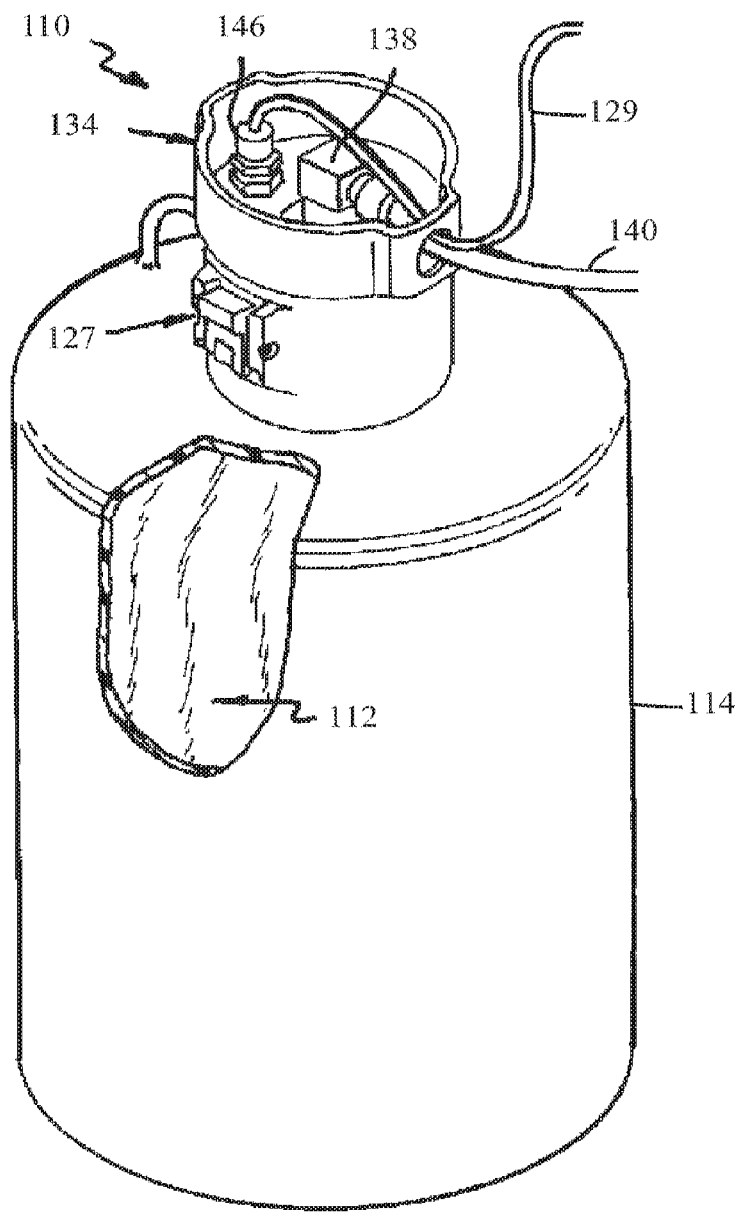
FIG. 2 is a partially cutaway perspective view of a second liner-based fluid storage and dispensing package, according to an embodiment of the present invention.

FIG. 2 is a partially cutaway perspective view of a second liner-based fluid storage and dispensing package 110, including a liner 112 disposed within an overpack container 114. The overpack container 114 is preferably substantially more rigid than the liner 112 to permit pressurized dispensation of the contents of the liner by pressurizing an internal space between the overpack container 114 and the liner 112. The illustrated overpack container 114 is substantially cylindrical in shape, and all fluid connections are made to the overpack container 114 and/or liner 112 through an upper portion of the overpack container 114.

Preferably, the container 114 includes a cap (not shown) matable with a mouth of the container 114 and adapted to receive a connector 134 having a sensing element 146 and port adapter 138. The sensing element 146—which may be adapted to communicate with an RFID tag or other electronic information storage device associated with any of the container 112, cap, or liner 112—is in electrical communication with an external control unit (not shown) by way of a sensor line 129. The port adapter 140 is preferably connected to an external inflation gas source (not shown) and a process tool (not shown) by way of a conduit 140, which may include multiple fluid lines (not shown). As such the port adapter 140 preferably provides a first and a second fluid passage to the interior of the container 114, with one passage being in fluid communication with the liner 112, and the other passage being in fluid communication with a pressurizable space between the container 114 and the liner 112.

Disposed on the outside of the connector 134 is a spring clip 127 useful for securing the connector 134 to any of the container 114 or a cap affixed thereto. Additional clips may be further provided to secure the connector 134. When the dispensing system 110 is properly assembled, the contents of the liner 112 may be dispensed by pressurization (e.g., with pressurized air or other gas) of a space between the container 114 and the liner 112, to supply such contents via the adapter 138 and conduit 140 to a process tool, such as a tool useful in the manufacture of integrated circuits. Information received by the sensing element 146 may be used to permit, deny, or regulate such dispensation.

Figure 3A:
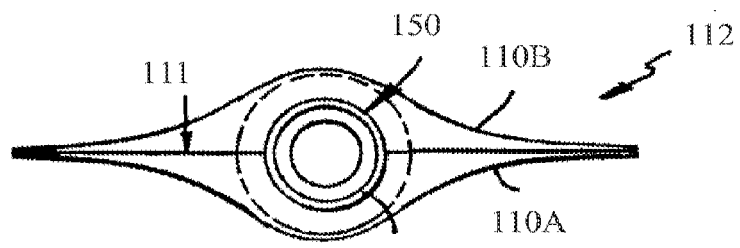
FIG. 3A is a top view of a collapsed liner for use with the fluid storage and dispensing package of FIG. 2, the liner having an edge-mounted fitment.
Figure 3B:
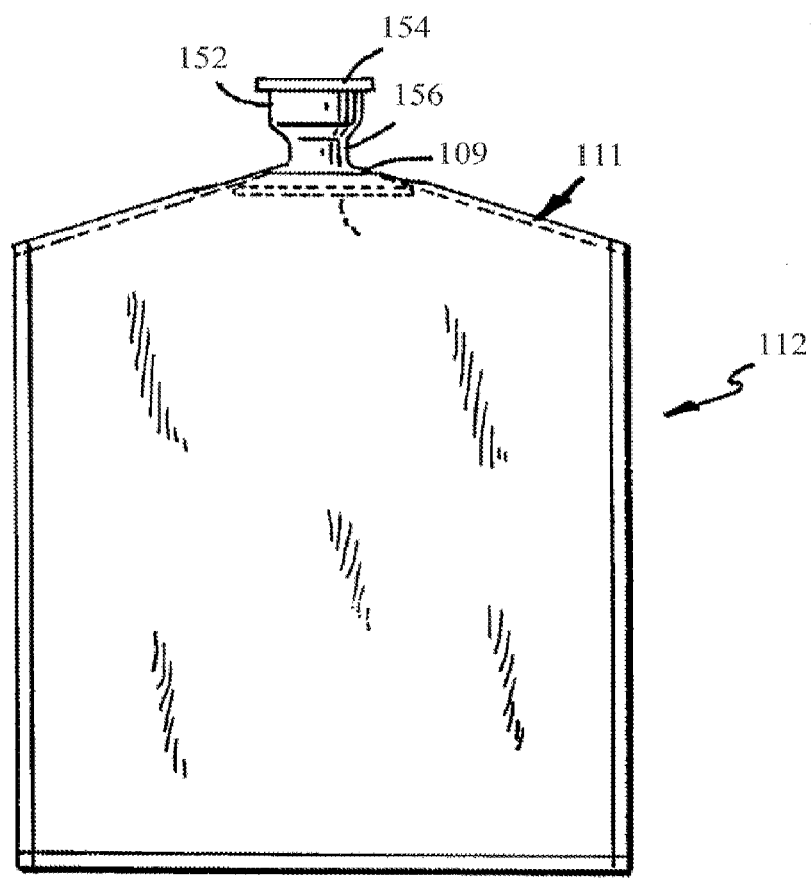
FIG. 3B is an elevation view of the liner of FIG. 3A.

FIGS. 3A-3B illustrate a collapsed liner 112 useable with the fluid storage and dispensing package of FIG. 2. The liner is constructed of two sheets 110A, 110B bonded along peripheral portions thereof to form a seam 111 enclosing an interior volume. Such liner 112 includes a fitment 150 bonded to the sheets 110A, 110B along one edge of the liner 112, proximate to an unbonded region or hole 109 along the interface between the sheets 110A, 110B. The fitment 150 may include a neck 156, a mouth 152, and a lip 154, and is preferably substantially more rigid than the material of the sheets 110A, 110B with which the liner 112 is formed.

Figure 4A:
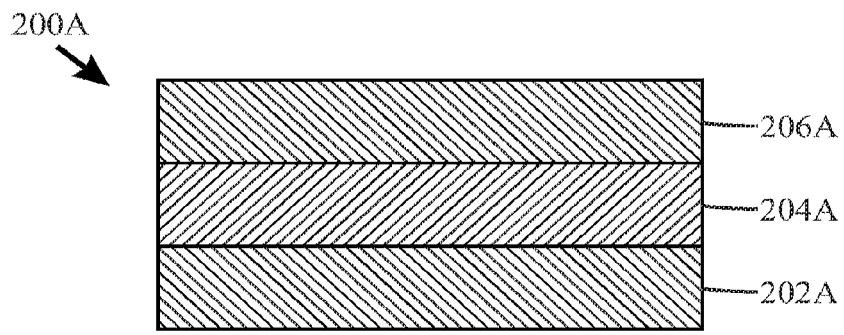
FIG. 4A is a cross-sectional schematic representation of a portion of a first multilayer sheet useful for forming a liner according to one embodiment, showing the component layers of the sheet.

FIG. 4A is a schematic representation of a multilayer sheet 200A according to one aspect of the invention, in cross-section, showing the component layers 202A, 204A, 206A of the sheet 200A. The sheet 200A is of a construction that is advantageous for containment of liquid medium within liners for use in connection with liquid medium packages. The sheet 200 thus may be advantageously used in connection with liquid medium storage and dispensing packages, including those disclosed herein, and is advantageous in application to zero head space liners, due to its low permeability and high strength characteristics.

Figure 4B:
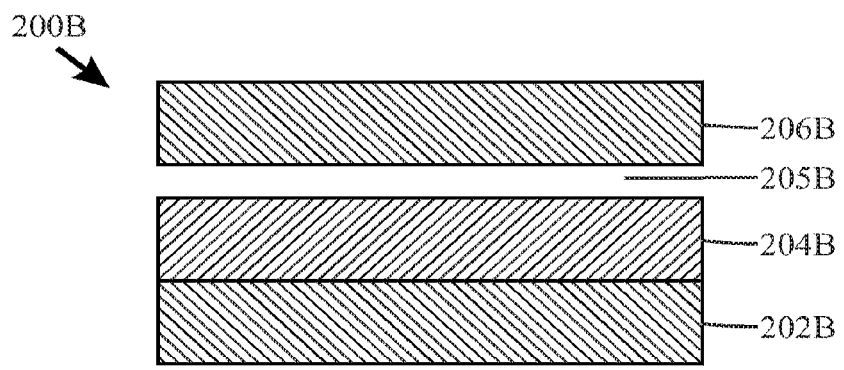
FIG. 4B is a cross-sectional schematic representation of a portion of a second multilayer sheet useful for forming a liner according to one embodiment, showing the component layers of the sheet.
Figure 4C:
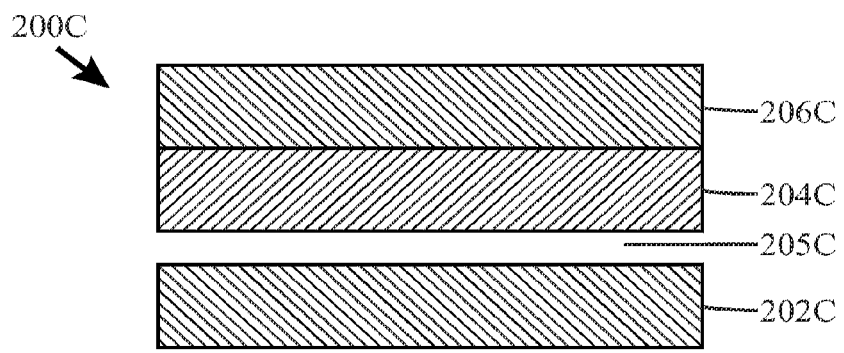
FIG. 4C is a cross-sectional schematic representation of a portion of a third multilayer sheet useful for forming a liner according to one embodiment, showing the component layers of the sheet.

The three layers of the sheet 200A include in sequence a first, inner layer of fluoropolymer film 202A, a second, intermediate layer of barrier film 204A, and third outer layer of outer film 206A. "Inner" in this context refers to the layer intended to contact the interior volume of a liner formed by bonding at least one sheet along peripheral portions thereof to define such interior volume. The various layers 202A, 204A, 206A of the sheet 200A may be bonded or laminated along substantially the entire major surfaces thereof, such as suggested in FIG. 4A, or, alternatively at least two sheets may be peripherally bonded (e.g., welded) only along peripheral portions thereof to bound gap or pocket formed between such layers of the sheet. As described in more detail below, maintaining as distinct at least two layers of a multilayer laminate may provide advantages in terms of mechanical robustness, to reduce vulnerability to fracture initiation and embrittlement. As shown in FIG. 4B, such a gap 205B may be formed between the barrier film 204B and the third layer 206B, with the fluoropolymer film 202B and the barrier film 204B of the sheet 200B being bonded along substantially entire major surfaces thereof. Alternatively, as shown in FIG. 4C, depicting a sheet 200C, such a gap 203C may be formed between the fluoropolymer film 202C and the barrier film 204C, with the barrier film 204C and third layer 206C being bonded along substantially entire major surfaces thereof. In a still further embodiment, a first gap or pocket may be formed between a fluoropolymer film layer and a barrier film layer, and a second gap or pocket may be formed between a barrier film layer and a third film layer.

A fluoropolymer film can be formed of any suitable fluoropolymer material, and can be formed by blowing, solvent casting, or other suitable film-forming technique. Useful fluoropolymer materials include, without limitation, polytetrafluoroethylene (PTFE), perfluoroalkoxy (PFA), fluorinated ethylene propylene (FEP), ethylene chlorotrifluoroethylene (ECTFE), or combinations of two or more of the foregoing. Considering high temperature resistance and adhesion to barrier materials, PFA is a preferred fluoropolymer film material for use in fabricating the at least one sheet. The thickness of the fluoropolymer film can be any suitable thickness providing the desired properties. In one embodiment, the thickness of the fluoropolymer film is a range of from 0.5 mil (13 microns) to 10 mils (250 microns), with 1 mil (25 microns) to 3 mils (75 microns) thickness being preferred.

Film layers can be bonded to one another in any suitable manner, such as by solvent welding, thermal lamination, extrusion lamination or extrusion coating, co-extrusion, consolidation under heat and pressure, use of an immediate adhesive or tie layer, spot-bonding of the respective films, ultrasonic welding of the films at their margins or in predetermined patterns so that the various film layers are bonded in face-to-face relationship with one another.

In order to enhance inter-layer bonding, any one or more of the film layers of the sheet can be treated to modify surface properties, such as roughness and surface energy. Desirable treatment methods include plasma etching, chemical etching (e.g., with $NaNH_4$ and Na naphthalene), corona discharge, flame spraying, electron-beam irradiation, ion etching, doping, tackifying, and mechanical abrading to improve bonding with the barrier film.

Following such treatment, the surface energy differential between adjacent layers should be within about 5 dynes/cm to facilitate bonding. Even more preferably, the surface energy differential between a first layer and a second layer should be within about 2 dynes/cm to enhance bonding. Most preferably, the surface energy differential between a first layer and a second layer should be within about 1 dyne/cm, or better yet about 0 dynes/cm, to further enhance bonding.

Of course, materials having desirable surface energy differentials may have undesirable melting point temperatures. In such an event, surface modification techniques may be used to alter the surface chemistry of the first layer and/or the second layer to improve the strength of the bond between the materials. It is believed that the applicable mechanism(s) include surface energy matching and/or surface roughening.

The barrier film may be of any suitable type material that provides acceptable permeation resistance to air, moisture and other ambient environmental species. Illustrative barrier film materials that can be usefully employed in various embodiments of the present invention include, without limitation, polyamide, polyetheretherketone (PEEK), polymonochlorotrifluoroethylene (PCTFE), liquid crystal polymer (LCP), and combinations of two or more of the foregoing. Polyamide, PEEK, and PCTFE are preferred barrier film materials. Within a sheet used to fabricate a liner, the barrier film may be constituted by, or include, metal coatings, oxide coatings, carbon coatings, and/or organic-inorganic composites, including aluminum, aluminum oxide, sapphire, diamond-like carbon, tantalum, silica ($SiO_2$), and engineering plastics such as polyethylene, polypropylene, polybutylene, polyethylene terephthalate, in combination with clay nanoparticles dispersoid materials.

The barrier film layer may be of any suitable thickness providing the requisite permeation resistance for the specific application in which the multilayer sheet is to be employed. In various embodiments of the invention, the thickness of the barrier film is in a range of from 0.5 mil (13 microns) to 10 mils (250 microns), with 0.5 mil (13 microns) to 2 mils (50 microns) being preferred.

The third film layer of a sheet used to fabricate a liner according to the invention optionally includes a third, outer layer that may be of any suitable character, e.g., specifically selected to provide mechanical strength, pin-hole resistance and high temperature resistance. Such third layer may for example be formed of a fluoropolymer, medium density polyethylene (MDPE), linear low density polyethylene (LLDPE), LLDPE blended with MDPE, polyamide, ethylene vinyl alcohol (EVOH), high density polyethylene (HDPE), or any other material providing the desired performance characteristics, as a protective layer in contact with the ambient environment of the multilayer sheet.

The component layers of the sheet may have any suitable thicknesses consistent with the specific end use of the sheet. The overall thickness of the sheet may be of any suitable value, as necessary or desirable in a given application of the sheet. In application to liners for liquid media, the overall thickness of the laminate may be in a range of 3 mils (75 microns) to 7 mils (175 microns), or from 4 mils (100 microns) to 6 mils (150 microns).

Anti-block agents may be used in the various layers of the multilayer sheet. An illustrative anti-block agent that may be used to advantage in fabricating films for the multilayer sheet laminate is diatomaceous earth.

A liner may be formed, e.g., by folding of a single sheet, or by superposition of multiple corresponding sheets, and welding of same at their edges to form edge seams of a leak-tight character, such as by ultrasonic welding or other suitable film processing technique. Alternatively, a liner can be formed from tubular stock and closed along ends thereof upon itself, and fabricated to provide port(s) for material ingress and egress, involving joining to the liner body appropriate coupling, connector, collar or other structural elements, by means of which the liner may be filled with material for storage and subsequent dispensing, and the stored material may be subsequently dispensed in use.

Figure 5A:
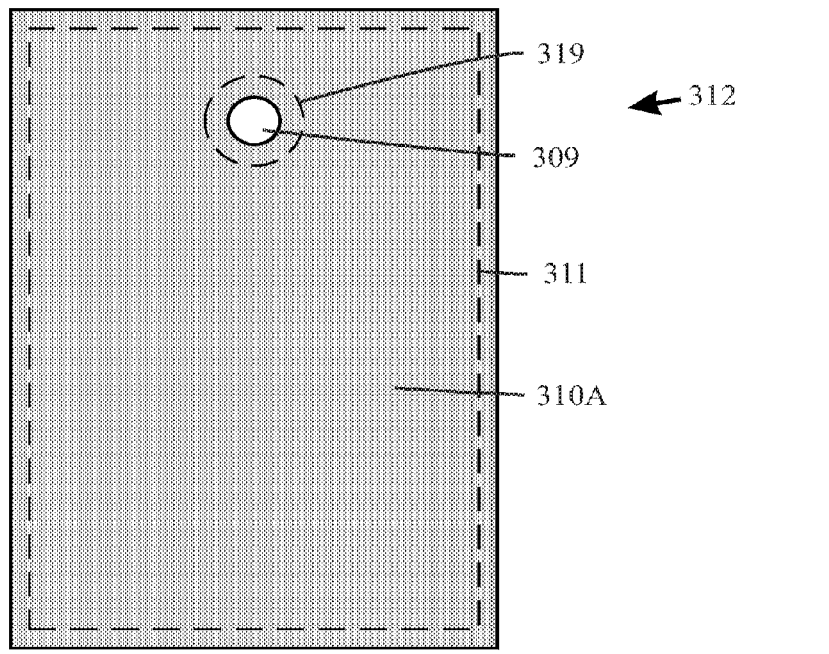
FIG. 5A is an elevation schematic representation of a liner that is peripherally bonded via welding, and that has an aperture defined in one face for receiving a fitment, according to a further embodiment.
Figure 5B:
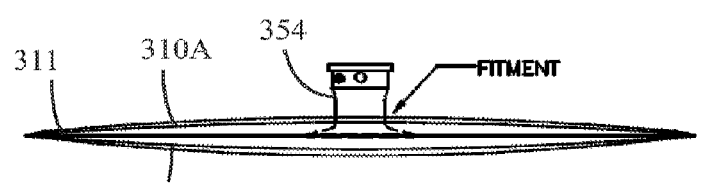
FIG. 5B is a top elevation schematic representation of the liner of FIG. 5A, with the addition of a protruding fitment bonded to at least one surface of the liner.

In one embodiment, a liner is formed from two sheets of material that are bonded along portions thereof to form at least one peripheral seam bounding an interior volume, with a fitment bonded to one of the sheets. Such a liner 312 is illustrated in FIGS. 5A-5B. FIG. 5A shows a first sheet 310A defining a hole 309 therein for receiving a fitment 354 (as illustrated in FIG. 5B). The multilayer sheets 310A, 310B are bonded along a weld zone 311 to form a peripheral seam bounding an interior volume of the liner 312.

Figure 5C:
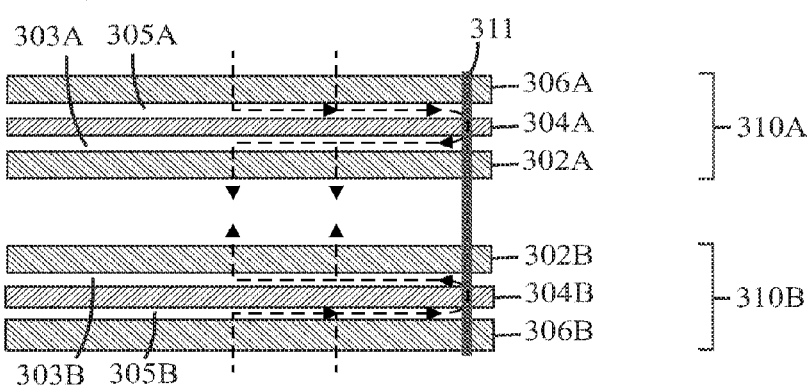
FIG. 5C is a cross-sectional schematic representation of a portion of the liner of FIG. 5A, including arrows showing a potential path of gas infiltration into the liner, with such path including a weld zone.
Figure 7:
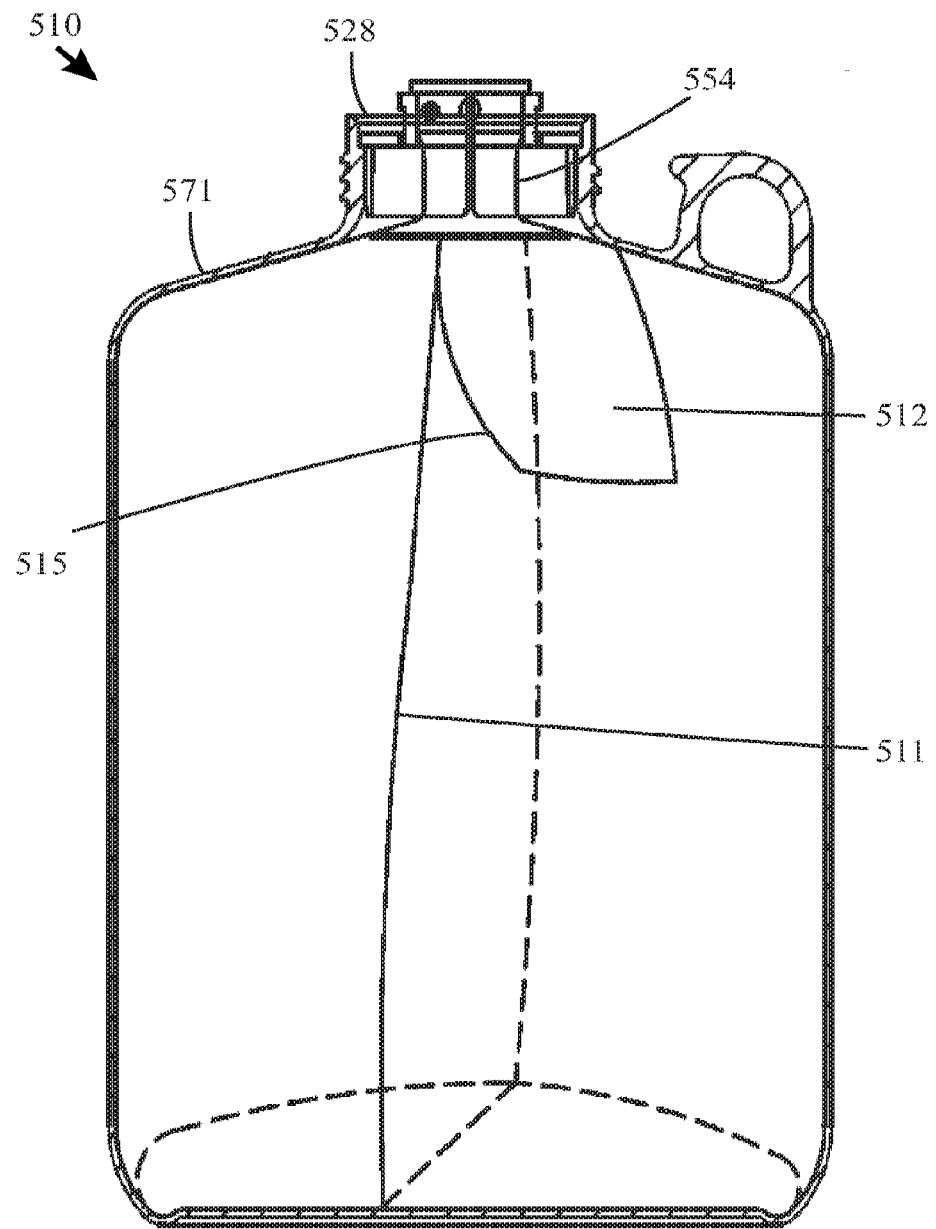
FIG. 7 is an elevation cross-sectional view of a third liner-based fluid storage and dispensing package, according to an embodiment of the present invention.

Referring to FIG. 5C, each sheet 310A, 310B includes three layers 302A, 304A, 306A, 302B, 304B, 306B that are peripherally bonded to form gaps or pockets 303A, 305A, 303B, 305B therebetween. The sheets 310A, 310B and all layers thereof may be welded in a single welding step (e.g., using a filament heater or other localized heating technique, preferably including application of pressure) at a common weld zone 311 to form a seam 311. In this regard, the formation a peripheral seam simultaneously effects bonding between (i) the fluoropolymer film layer and the barrier film layer, and (ii) the barrier film layer and the third film layer, of at least one sheet A two-dimensional liner having a fitment bonded to a face thereof (such as the liner 312 illustrated in FIGS. 5A-5B) may be inserted into an overpack container as shown in FIG. 7. A storage and dispensing system 510 includes an overpack container 571 adapted to receive a two-dimensional liner 512 having a fitment 554 defined in one face thereof. An upper portion 515 of the liner may be folded over the remaining liner body to facilitate registration of the fitment 554 of the liner 512 with a port 528 of the overpack container 571.

To achieving desired liner performance with respect to inertness of the inner material, gas permeability, and mechanical strength, balancing of various factors should be considered. As indicated previously, fluoropolymer films are desirably inert, but inherently suffer from gas permeability problems. Barrier films are generally stiffer in character, and while they provide good gas barrier utility, they can be subject to mechanical failure (e.g., due to fatigue) if bonded along major surfaces thereof to other materials. That is, if a barrier film and a (e.g., surface treated) fluoropolymer film are laminated or otherwise bonded together along substantially and higher major surfaces thereof, the resulting product is vulnerable to fracture initiation in the more brittle barrier that propagates to the fluorinated film. Generally, the resulting film becomes very stiff and difficult to manage in part due to embrittlement caused during surface lamination, and in part due to increased thickness and the restraint of independent movement between individual film layers. Accordingly, for mechanical robustness, it may be advantageous to maintain a barrier film layer separate from a fluoropolymer film layer along major surfaces thereof.

One way to maintaining a barrier film layer separate from a fluoropolymer film layer along major surfaces thereof is to locally weld (e.g., by filament welding) such film layers along peripheral portions thereof, to define a gap or pocket within the resulting sheet between the component layers. On problem with this approach, however, is that the peripheral welds appear vulnerable to "short circuit" gas flow. Any gas that enters the gap or pocket between layers is subject to gross lateral migration to a point of least resistance. Owing to the elevated melt temperatures of fluoropolymers relative to most barrier materials, the process of peripherally welding fluoropolymer and barrier film layers at temperatures sufficient to melt the fluoropolymer tends to result in reduction of barrier film thickness and/or integrity at the weld zone. As illustrated in FIG. 5C (i.e., with dashed lines and arrows), gas can propagate within the gaps or pockets 303A, 305A, 303B, 305B between peripherally bonded film layers 302A, 304A, 306A, 302B, 304B, 306B and then propagate though a peripheral weld 311, thus bypassing the intermediate barrier layers 304A, 304B, which would otherwise prevent the passage of gas therethrough. It would be desirable to avoid such gas short-circuiting in liners composes of sheets having at least one intra-sheet pocket or gap therein.

Applicants have found the aforementioned gas short-circuiting can be substantially eliminated by locally laminating the various layers of a sheet at, or slightly inboard (relative to an edge of a sheet) of, a peripheral weld zone. Such local lamination can be achieved, for example, utilizing filament heaters, and may be performed in advance of the peripheral welding step, or vice-versa if desired. In one embodiment, a lamination zone and a weld zone are substantially coincident. In another embodiment, a lamination zone is disposed, inboard from said weld zone by no more than 0.25 inch (6.4 mm). Such lamination is desirably performed at a lower temperature, but a higher pressure, relative to the welding. Conditions for such lamination may avoid full melting of the barrier material, yet still provide sufficient tack or interpenetration of polymer chains between layers to prevent lateral migration of gas to an outboard weld zone. While FIG. 6C illustrates a lamination zone extending between the inner layers 402A, 402B, the relatively weak bond afforded by such localized lamination may be broken between the inner layers 402A, 402B upon expansion of the liner (e.g., to permit addition of chemical reagent); however, breakage of such inter-sheet lamination does not detrimentally affect the liner 412 or degrade gas barrier performance so long as the intralayer lamination along lamination zone 416 remains intact.

In one example, local lamination between two three-layer sheets, each having a PEN barrier film layer disposed between two layers of PFA film (i.e., a fluoropolymer "inner" film layer and a third "outer" film layer composed of the same fluoropolymer material) may be performed by applying for about 30 seconds a contact pressure of approximately 80 psi and a temperature of approximately 10 C below the melting temperature of PEN (the material in this instance having the lowest melting point of the layers to be joined). Owing to the various possible definitions of "melting" in the context of polymers, a differential scanning calorimetry melting point value may be used. Thereafter, local welding slightly outboard of the lamination may be performed by applying for 20 seconds filament heaters at a higher temperature (e.g., 300 C to 320 C), and also applying local pressures between about 19-26 psi (depending on location, with 26 psi along a fitment, 22 psi along long peripheral edges, and about 19 psi along short edges of a liner).

Figure 6A:
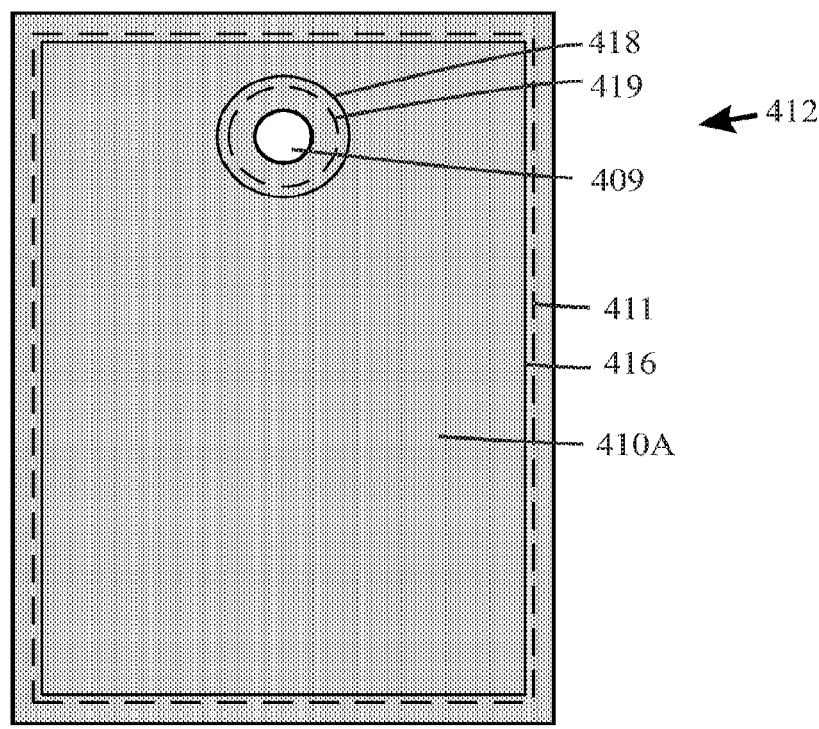
FIG. 6A is an elevation schematic representation of a liner that is peripherally bonded via welding and lamination, and that has an aperture defined in one face for receiving a fitment, according to a further embodiment.
Figure 6B:
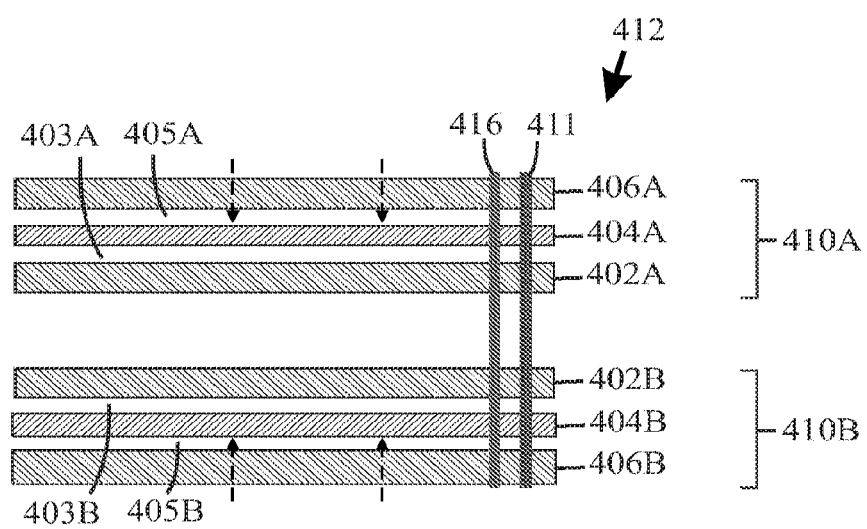
FIG. 6B is a cross-sectional schematic representation of a portion of the liner of FIG. 6A, including arrows showing paths of gas movement having directions perpendicular to the layers.

Schematic illustrations showing the result of such lamination and welding processes in fabrication of a liner is shown in FIGS. 6A-6B. A liner 412 composed of two sheets 410A, 410B includes along the periphery thereof an outer weld zone 411, and a slightly inboard lamination zone 416. Similarly, along the face of one sheet 410A proximate to a hole 409 defined therein, localized intra-sheet lamination and welding results in formation of a weld zone 419 that is circumscribed by a lamination zone 418. A fitment (not shown) may be registered with the hole 409 and bonded to the sheet 410A, preferably before the two sheets 410A, 410B are peripherally bonded to one another. Preferably, a single lamination step is used for all layers 402A, 404A, 406A, 402B, 404B, 406B of both sheets 410A, 410B along a common peripheral lamination zone 416, and likewise a single welding step is used for all layers 402A, 404A, 406A, 402B, 404B, 406B of both sheets 410A, 410B along a common peripheral welding zone 411.

As shown in FIG. 6B, the presence of local lamination (at zone 416) between the layers 402A, 404A, 406A and 402B, 404B, 406B eliminates the ability of gas travel via outer gaps or pockets 403A, 403B to reach the peripheral weld zone 411, such that gas permeation into the inner gaps or pockets 405A, 405B is blocked by the intermediate barrier layer 404A, 404B of each sheet 410A, 401B. In this manner, short-circuiting of gas around the barrier layer 404A, 404B (e.g., through the weld zone 411) of each sheet 410A, 410B is substantially eliminated. With various layers 402A, 404A, 406A, 402B, 404B, 406B remaining distinct from one another along major surfaces thereof, vulnerability to fracture initiation and embrittlement incident to lamination of plural layers along substantially entire major surfaces thereof is also reduced.

Optional fourth and/or fifth layers may be used in a liner according to the present invention. In one embodiment, such optional layer(s) include one or more tie layers between any of the fluoropolymer film layer, barrier film layer, and third layer. In another embodiment, a second barrier film layer is provided. In still another embodiment, an elastic material is provided, preferably outside the third layer, to provide further containment in case the barrier layer is compromised.

Multi-layer sheets as described herein provide unexpectedly superior performance when used to fabricate liners for use in liner-based pressure-dispense packages. Embodiments including one or more intrasheet gaps or pockets between layers provide excellent "slip" characteristics so that a liner formed of such film is able to move against an adjacent structure in contact with such surface, without undue wrinkling, binding, or surface hold-up that would otherwise increase the susceptibility of the liner and liquid therein to particle and microbubble formation. Such sheet additionally has superior flexural character, strength and deformation properties that render it suitable for use in liners of even very large size. Further, the sheet has superior permeability resistance to gases that might otherwise pass though the liner film and enter the liner interior volume to degrade the zero head space character when the liner is deployed in a zero head space conformation.

In specific embodiments, sheets useful in forming liners according to the invention can include the following combinations of material layers:

1) Etched PFA inner, PEN barrier, etched PFA outer
2) etched PFA inner, polyamide barrier, etched PFA outer (outer could be non-etched and not attached to polyamide)
3) etched PFA inner, tie layer, glass coated polyamide (glass toward inner PFA), etched PFA outer (this provides both moisture and gas barrier properties; the tie layer is preferably a high purity material with relatively high temperature capabilities and the ability to bond to both glass and etched PFA, e.g., a modified PVDF, ETFE, or ECTFE ("tie-layer" type materials of these fluoropolymers are commercially available))
4) etched PFA inner, PEEK, etched PFA outer
5) PFA inner, tie layer, PEEK, etched PFA outer
6) PFA inner etched, metal or metal oxide (PVD- or CVD-coated onto PFA), outer layer of PFA or PEEK
7) PFA inner etched, tie layer, metal laminate
8) PFA inner etched, LCP, PFA outer etched
9) PFA inner etched, tie layer, LCP, tie layer, PFA outer etched
10) etched PFA inner, PCTFE, PFA outer etched In each case PFA has been chosen as a preferred embodiment because it has crack resistance superior to FEP and is available in semiconductor grades. However, it is most expensive, so alternatives of PTFE or FEP may be employed. ECTFE may also be substituted. PFA is desirably etched or otherwise surface treated on the side facing the film stack (against polyamide). PTFE could be used, but generally must be chemically etched (e.g., etched with sodium napthalate) to enable bonding to other materials. This creates the potential for metal contamination and is environmentally unfriendly. FEP film could also be used as the wetted surface as it also has excellent chemical resistance. It can also be effectively etched by plasma. FEP may not have sufficient crack resistance to resist pinholing during transportation in some applications. The outer film needs to be able to handle the heat of welding the PFA together, without melting and sticking to heater bars or degrading. The barrier layer must also have sufficient temperature capabilities to handle welding processes; they can melt, but should not degrade. Polyamide, LCP, and PEEK have demonstrated this capability and have sufficiently high barrier properties. PCTFE may not be suitable as a barrier film in some embodiments, as it may also require etching to bond to other material and it has limited temperature capability.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

The invention claimed is:

1. A container liner comprising at least one sheet bonded along portions thereof to form at least one peripheral seam bounding an interior volume, with the at least one sheet comprising a fluoropolymer film layer, a barrier film layer, and a third film layer, with (i) the fluoropolymer film layer bonded along at least peripheral portions thereof to the barrier film layer and (ii) the third layer bonded along at least peripheral portions thereof to the barrier film layer, wherein said fluoropolymer film layer contacts said interior volume, and said barrier film layer is disposed between said fluoropolymer film layer and said third layer;

wherein said liner is characterized in that the at least one sheet comprises a peripheral common weld zone extending through all layers of said container liner and forming said at least one peripheral seam bounding said interior volume, and the at least one sheet comprises a peripheral common lamination zone disposed a non-zero distance of no more than 6.4 millimeters inboard of said common weld zone, wherein said common lamination zone extends through a first thickness and a second thickness of the at least one sheet including all layers of said at least one sheet; and wherein the peripheral common lamination zone is formed at a temperature below the differential scanning calorimetry (DSC) melting point value of the layer of the first, second, or third layer comprising the lowest DSC melting point value.

2. The container liner of claim 1, wherein the fluoropolymer film layer and the barrier film layer are bonded along peripheral portions thereof to define a first gap or pocket therebetween within said at least one sheet.

3. The container liner of claim 1, wherein the third layer and the barrier film layer are bonded along peripheral portions thereof to define a second gap or pocket therebetween within said at least one sheet.

4. The container liner of claim 1, wherein the at least one sheet comprises a first sheet and a second sheet.

5. The container liner of claim 1, wherein each of (i) the fluoropolymer film layer and the barrier film layer, and (ii) the barrier film layer and the third layer, are bonded along substantially entire major surfaces thereof to form each sheet of said at least one sheet.

6. The container liner of claim 1, wherein either (i) the fluoropolymer film layer and the barrier film layer, or (ii) the barrier film layer and the third layer, is bonded along substantially entire major surfaces thereof within said at least one sheet.

7. The container liner of claim 1, wherein:
the fluoropolymer film layer and the barrier film layer are bonded along peripheral portions thereof to define a first gap or pocket within said at least one sheet; and
the third film layer and the barrier film layer are bonded along peripheral portions thereof to define a second gap or pocket within said at least one sheet.

8. The container liner of claim 1, further comprising an aperture-defining fitment bonded to a sheet of said at least one sheet, wherein the fitment is substantially more rigid than said sheet of said at least one sheet.

9. The container liner of claim 1, wherein the barrier film layer comprises any of polyamide, polyetheretherketone (PEEK), polymonochlorotrifluoroethylene (PCTFE), polyester, polyethylene naphthalate (PEN), liquid crystal polymer (LCP), a metal, an oxide, a carbon material, an organic-inorganic composite, and a blend, composite, coating, or combination of any of the foregoing.

10. The container liner of claim 1, wherein the fluoropolymer film layer comprises any of polytetrafluoroethylene (PTFE), perfluoroalkoxy (PFA), fluorinated ethylene propylene (FEP), ethylene chlorotrifluoroethlyene (ECTFE), and a blend, composite, or combination of two or more of the foregoing.

11. The container liner of claim 1, wherein the fluoropolymer film layer has a thickness in a range of from about 13 microns to about 250 microns.

12. The container liner of claim 1, wherein the fluoropolymer film layer has a thickness in a range of from about 25 microns to about 75 microns.

13. The container liner of claim 1, wherein the barrier film layer is bonded (i) to the fluoropolymer film layer and (ii) to the third film layer, by use of an intermediate adhesive or tie layer.

14. The container liner of claim 1, characterized by any one or more of the following:
(i) the fluoropolymer film layer is treated to enhance bondability to the barrier film layer;
(ii) the third film layer is treated to enhance bondability to the barrier film layer; and
(iii) the barrier film layer is treated to enhance bondability to any of the fluoropolymer film layer and the third film layer.

15. The container liner of claim 14, wherein any of the fluoropolymer film layer, the third film layer, and the barrier film layer is treated by any of plasma etching, chemical etching, corona discharge, flame spraying, electron-beam irradiation, ion etching, doping, tackifying, and mechanical abrading.

16. The container liner of claim 14, wherein each of (i) the fluoropolymer film layer and the barrier film layer, and (ii) the barrier film layer and the third film layer, has a surface energy difference of no greater than about 5 dynes/cm along at least peripheral portions of adjacent surfaces thereof following such treatment.

17. The container liner of claim 14, wherein each of (i) the fluoropolymer film layer and the barrier film layer, and (ii) the barrier film layer and the third film layer, has a surface energy difference of no greater than about 2 dynes/cm along at least peripheral portions of adjacent surfaces thereof following such treatment.

18. The container liner of claim 1, wherein the barrier film has a thickness in a range of from about 13 microns to about 250 microns.

19. The container liner of claim 1, wherein said at least one sheet has a thickness in a range of from about 75 microns to about 175 microns.

20. The container liner of claim 1, wherein said third film layer is characterized by any of:
   (i) substantially the same composition as the fluorinated polymer layer;
   (ii) substantially the same coefficient of thermal expansion as the fluorinated polymer layer;
   (iii) a substantially higher melting temperature than the barrier layer; and
   (iv) a substantially non-stick surface character when heated to an absolute temperature of at least ninety percent of its melting point.

21. The container liner of claim 1, wherein said third film layer has substantially the same composition as the fluorinated polymer layer.

22. The container liner of claim 1, wherein said third film layer has substantially the same coefficient of thermal expansion as the fluorinated polymer layer.

23. The container liner of claim 1, wherein said third film layer has a substantially higher melting temperature than the barrier layer.

24. The container liner of claim 1, wherein said third film layer has a substantially non-stick surface character when heated to an absolute temperature of at least ninety percent of its melting point.

25. The container liner of claim 16, wherein said third film layer comprises a fluoropolymer material.

26. The container liner of claim 1, wherein said third film layer has substantially the same thickness as the fluoropolymer film layer.

27. The container liner of claim 1, wherein said third film layer comprises any of medium density polyethylene (MDPE), linear low density polyethylene (LLDPE), LLDPE blended with MDPE, polyamide, ethylene vinyl alcohol (EVOH), and high density polyethylene (HDPE).

28. The container liner of claim 1, wherein at least one of said fluoropolymer film layer, said barrier layer, and said third layer comprises an anti-block agent.

29. The container liner of claim 28, wherein said anti-block agent comprises diatomaceous earth.

30. The container liner of claim 1, adapted for externally pressurized dispensation of material from the liner.

31. A material storage and dispensing package comprising the container liner of claim 1 disposed within an overpack container, wherein the container is substantially more rigid than said at least one sheet.

32. The material storage and dispensing package of claim 31, wherein an inner surface of the container and an outer surface of the liner bound a pressurizable space, the container being connected to an inflation gas source adapted to pressurize the pressurizable space to thereby dispense contents of the liner.

33. The material storage and dispensing package of claim 31, wherein the liner holds a chemical reagent.

34. The material storage and dispensing package of claim 33, wherein the chemical reagent comprises a reagent for microelectronic device manufacturing.

35. The material storage and dispensing package of claim 34, wherein the reagent for microelectronic device manufacturing comprises a photoresist.

36. The material storage and dispensing package of claim 34, as coupled in reagent supply relationship to a microelectronic device manufacturing tool.

37. The material storage and dispensing package of claim 33, wherein the chemical reagent is held in the liner in a zero or near-zero headspace conformation.

38. The material storage and dispensing package of claim 31, wherein the liner is coupled with a dispense assembly adapted for discharge of a chemical reagent from the liner by pressure dispense operation.

39. A method of supplying material in a pure state for dispensing, said method comprising packaging said material in a liner according to claim 1.

40. The method of claim 39, wherein said dispensing comprises pressure dispense operation.

41. The method of claim 39, wherein said material comprises a chemical reagent for microelectronic device manufacturing.

42. The method of claim 39, further comprising dispensing said material from said liner.

43. The method of claim 41, wherein the dispensed material is flowed to a microelectronic device manufacturing tool.

44. A method comprising:
   bonding at least one sheet along portions thereof to form at least one peripheral seam bounding an interior volume, with the at least one sheet comprising (i) a fluoropolymer film layer bonded along at least peripheral portions thereof to a barrier film layer and (ii) a third layer bonded along at least peripheral portions thereof to the barrier film layer, wherein said fluoropolymer film layer contacts said interior volume, said barrier film layer is disposed between said fluoropolymer film layer and said third layer, and at least one gap or pocket is formed between any of (a) the fluoropolymer film layer and the barrier film layer and (b) the third layer and the barrier film layer, wherein said bonding includes formation of a peripheral weld zone extending through all layers of said container liner to yield said peripheral seam; and
   forming a peripheral common lamination zone disposed a non-zero distance of no more than 6.4 millimeters inboard of said common weld zone, wherein said common lamination zone extends through a first thickness and a second thickness of the at least one sheet including all layers of said at least one sheet; wherein the peripheral common lamination zone is formed at a temperature below the differential scanning calorimetry (DSC) melting point value of the layer of the first, second, or third layer comprising the lowest DSC melting point value.

* * * * *